US009892809B2

(12) United States Patent
Lacey et al.

(10) Patent No.: US 9,892,809 B2
(45) Date of Patent: Feb. 13, 2018

(54) MODULAR COLLIMATOR FOR IMAGING DETECTOR ASSEMBLY

(71) Applicant: General Electric Company, Schenectady, NY (US)

(72) Inventors: Joseph James Lacey, Cambridge, WI (US); David Michael Hoffman, New Berlin, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 242 days.

(21) Appl. No.: 14/992,218

(22) Filed: Jan. 11, 2016

(65) Prior Publication Data
US 2017/0200522 A1 Jul. 13, 2017

(51) Int. Cl.
*G21K 1/02* (2006.01)
*G01T 1/20* (2006.01)

(52) U.S. Cl.
CPC ............... *G21K 1/025* (2013.01); *G01T 1/20* (2013.01)

(58) Field of Classification Search
CPC ... A61B 6/4258; A61B 6/4291; A61B 6/4035; A61B 6/483; G01N 2223/316; G21K 1/10; G21K 1/025; G21K 1/04

USPC .......................... 250/363.1, 363.08; 378/147
See application file for complete search history.

(56) References Cited

U.S. PATENT DOCUMENTS

| 6,175,615 B1 * | 1/2001 | Guru ...................... G21K 1/025 |
| | | 378/147 |
| 2013/0077738 A1 | 3/2013 | Kreisler et al. |
| 2017/0265822 A1 * | 9/2017 | Du ........................... A61B 6/06 |

* cited by examiner

*Primary Examiner* — Don Wong
(74) *Attorney, Agent, or Firm* — Fletcher Yoder, P.C.

(57) ABSTRACT

A collimator for an imaging detector assembly of a computed tomography imaging system is provided. The collimator includes a collimator module that includes a primary collimation grid having a first edge and a second edge. The primary collimation grid includes multiple radiation absorbing elements spaced apart from each other and configured to provide primary beam collimation. A first radiation absorbing element is disposed on the first edge and a second radiation absorbing element is disposed on the second edge. The collimator module includes multiple plates located on a side of the primary collimation grid and configured to absorb scattered radiation. A respective plate of the multiple plates is disposed over a respective radiation absorbing element of the multiple radiation absorbing elements of the primary collimation grid except the second radiation absorbing element disposed on the second edge of the primary collimation grid.

20 Claims, 5 Drawing Sheets

MODULAR COLLIMATOR FOR IMAGING DETECTOR ASSEMBLY

BACKGROUND

The subject matter disclosed herein relates to imaging systems, and more particularly, to a collimator for an imaging detector assembly.

In computed tomography (CT), X-ray radiation spans a subject of interest, such as a human patient, and a portion of the radiation impacts a detector where the image data is collected. In digital X-ray systems a photodetector produces signals representative of the amount or intensity of radiation impacting discrete pixel regions of a detector surface. The signals may then be processed to generate an image that may be displayed for review. In the images produced by such systems, it may be possible to identify and examine the internal structures and organs within a patient's body. In CT systems a detector array, including a series of detector elements, produces similar signals through various positions as a gantry is displaced around a patient, allowing volumetric reconstructions to be obtained.

A typical CT detector may include a collimator assembly including collimator modules disposed adjacent to each other (e.g., edge to edge). However, these collimator modules may experience phenomena that results in artifacts in the image data. For example, module to module thermal mechanical movement (e.g., due to expansion) may lead to channel to channel variation resulting in image artifacts such as rings and bands. In addition, g-loading motion artifacts may also occur. In certain collimator assemblies, adjacent collimator modules each have a plate on adjacent edges. This type of collimator assembly may require tight tolerance control due to small gaps between these adjacent plates on the adjacent edges across sensor boundaries or it may require larger sensor to sensor gaps resulting in reduction of image resolution. In other collimator assemblies, collimator modules may share a scatter plate across module boundaries. Utilization of a shared plate may result in sensor to sensor boundary issues such as gain shift due positional change in the shared plate.

BRIEF DESCRIPTION

In accordance with a first embodiment, an imaging detector assembly is provided. The imaging detector assembly includes a scintillator assembly configured to receive incident radiation and configured to convert incident radiation into lower energy optical photons for transmission to the detector array, wherein the scintillator assembly includes multiple scintillator packs. Each scintillator pack includes multiple scintillator elements. Each scintillator element provides the lower energy optical photons to a respective detector element of multiple detector elements. The imaging detector assembly also includes a collimator assembly including multiple collimator modules. Each collimator module is disposed above a respective scintillator pack. Each collimator module includes a primary collimation grid including multiple radiation absorbing elements spaced apart from each other and configured to provide primary beam collimation, each primary collimation grid includes a first radiation absorbing element disposed on a first edge and a second radiation absorbing element disposed on a second edge opposite the first edge. Each collimator module includes multiple plates configured to absorb scattered radiation. Each multiple of plates are disposed on a first side of the primary collimation grid opposite from the respective scintillator pack. A respective plate of each of the multiple of plates is disposed over a respective radiation absorbing element of the respective multiple radiation absorbing elements of the respective primary collimation grid except the second radiation absorbing element disposed on the second edge of the respective primary collimation grid.

In accordance with a second embodiment, a collimator for an imaging detector assembly of a computed tomography imaging system is provided. The collimator includes a first collimator module. The first collimator module includes a first primary collimation grid having a first edge and a second edge. The first primary collimation grid includes a first multiple of radiation absorbing elements spaced apart from each other and configured to provide primary beam collimation. A first radiation absorbing element of the first multiple of the radiation absorbing elements is disposed on the first edge and a second radiation absorbing element of the first multiple of radiation absorbing elements is disposed on the second edge. The first collimator module also includes a first multiple of plates located on a first side of the first primary collimation grid and configured to absorb scattered radiation. A respective plate of the first multiple of plates is disposed over a respective radiation absorbing element of the first multiple of radiation absorbing elements of the first primary collimation grid except the second radiation absorbing element disposed on the second edge of the first primary collimation grid.

In accordance with a third embodiment, a collimator for an imaging detector assembly of a computed tomography imaging system. The collimator includes multiple collimator modules. Each collimator module includes a primary collimation grid including multiple radiation absorbing elements spaced apart from each other and configured to provide primary beam collimation. Each primary collimation grid includes a first radiation absorbing element disposed on a first edge and a second radiation absorbing element disposed on a second edge opposite the first edge. Each collimator module includes multiple plates configured to absorb scattered radiation. Each multiple of plates is disposed on a side of the primary collimation grid, and a respective plate of each of the multiple of plates is disposed over a respective radiation absorbing element of the respective multiple of radiation absorbing elements of the respective primary collimation grid except the second radiation absorbing element disposed on the second edge of the respective primary collimation grid. The multiple collimator modules include a first collimator module and a second collimator module disposed adjacent to each other. The first collimator module includes a first primary collimation grid. The second collimator module includes a second primary collimation grid. The second edge of the first primary collimation grid is disposed adjacent to the first edge of the second collimator module. A plate disposed over the first radiation absorbing element disposed along the first edge of the second collimator module is configured to absorb some of the scattered radiation for the first collimator module.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
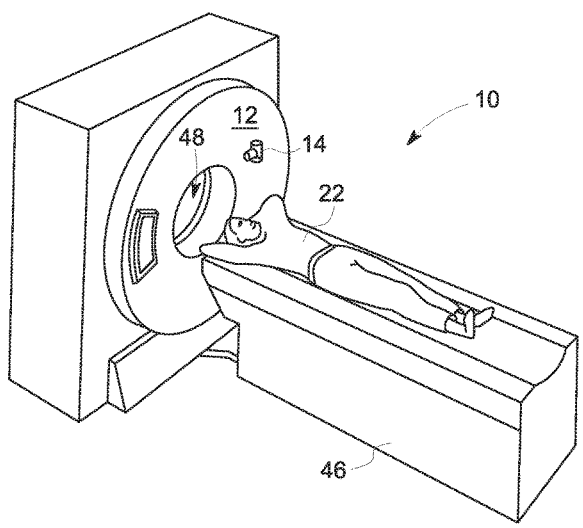
FIG. 1 is a combined pictorial view and block diagram of a CT imaging system illustrating an embodiment of the present disclosure.
Figure 1:
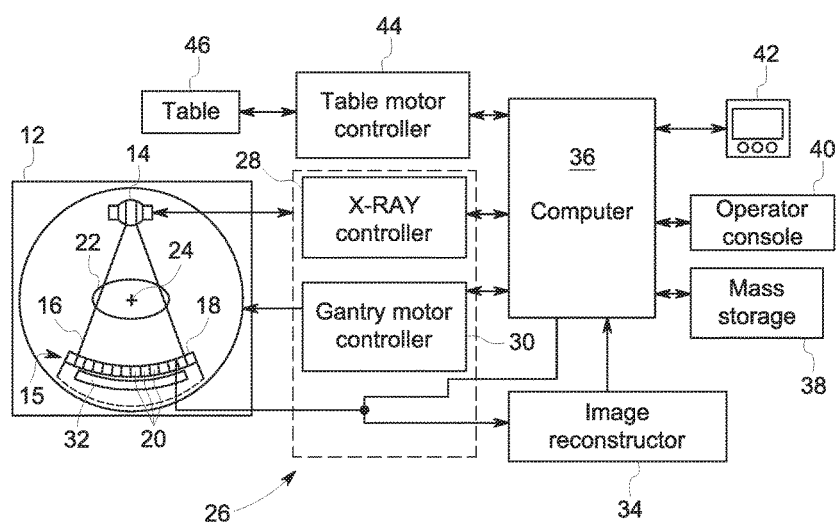

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present disclosure provides for a collimator assembly for a computed tomography (CT) detector assembly that includes collimator modules (e.g., integrated with portions of CT detectors such as a scintillator) constructed to avoid boundary issues associated with typical module to module interactions (e.g., gain shift in shared scattered plate arrangements or tight module to module gaps in non shared scattered plate arrangements). By way of example, in certain embodiments, each collimator module (e.g., one-dimensional (1D) and two-dimensional (2D) collimator modules) in the present disclosure includes a primary collimation grid (e.g., disposed above a scintillator pack) having a first edge and a second edge and a plurality of radiation absorbing elements (e.g., septa) spaced apart with a first radiation absorbing element disposed on the first edge and a second radiation absorbing element disposed on a second edge. The primary collimation grid performs primary collimation and maintains primary beam collimation for each scintillator channel and detector element. As a result collimation is unique to each sensor. Each collimator module also includes a plurality of plates (e.g., scatter plates) configured to absorb scattered radiation. A plate is disposed over (and vertically aligned) over each radiation absorbing element of the primary collimation grid except on one edge (e.g., the second edge). Thus, when a first collimator module is disposed adjacent to a second collimator module (i.e., the edges of the collimator modules interface) so that the first collimator module has a plate located at the edge of the primary collimation grid adjacent an edge of the primary collimation grid of the second collimator module that does not have a plate on the edge, the plate located along the edge of the first collimator module absorbs some of the scattered radiation for the edge of the second collimator module (and the associated scintillator channel and detector element).

Each plate is focally aligned to a point in space. In addition, each plate includes a width greater than the radiation absorbing elements of the primary collimation grid (e.g., resulting in reduction in toggle effect sensitivity). Further, the collimator modules each have a separation of function with regards to primary beam collimation and absorbing scattered radiation.

By not sharing a plate across the module to module boundary, the disclosed embodiments of the collimator assembly avoid module to module thermal mechanical movement issues. In other words, since primary collimation is performed separately within each collimator module, each module is insensitive to movement. In addition, the disclosed embodiments of the collimator assembly are not subject to overly tight tolerance control. Further, by not sharing a plate at the module to module boundary, the need for precision detector rail temperature control is reduced. Yet further, the integrated primary collimation grid reduces scatter plate alignment issues. The present embodiments of the collimator assembly may reduce artifacts in images (e.g., thermal expansion induced artifacts, focal spot motion induced artifacts, etc.), while enabling the collimator assembly to be utilized with a detector having wider coverage (e.g., 40 millimeters (mm) to 100 mm) and with a 2 focal spot tube (twin peaks tube system). Thus, the collimator assembly may be utilized at higher rotation speeds (e.g., rotation in 0.2 seconds).

With the foregoing in mind and referring to FIG. 1, a computed tomography (CT) imaging system 10 is shown as including a gantry 12 representative of a "third generation" CT scanner. Gantry 12 has an X-ray source 14 that projects a beam of X-rays 16 toward a detector assembly 15 on the opposite side of the gantry 12. The detector assembly 15 includes a collimator assembly 18, a plurality of detector modules 20 (e.g., each having a detector array), and data acquisition systems (DAS) 32. As described in greater detail below, the collimator assembly 18 may include a plurality of collimator modules integrated with components of the detector modules 20 (e.g., scintillator). As described in greater detail below, each collimator module may include a primary collimation grid having a plurality of radiation absorbing elements or septa spaced apart from each other and a plurality of plates (e.g., scatter plates) disposed over each radiation absorbing element of primary collimation grid except along one edge. The plurality of detector modules 20 detect the projected X-rays that pass through a medical patient 22, and DAS 32 converts the data to digital signals for subsequent processing. Each detector module 20 in a conventional system produces an analog electrical signal that represents the intensity of an impinging X-ray beam and hence the attenuated beam as it passes through the patient 22. During a scan to acquire X-ray projection data, gantry 12 and the components mounted thereon rotate about a center of rotation 24.

Rotation of gantry 12 and the operation of X-ray source 14 are governed by a control mechanism 26 of CT system 10. Control mechanism 26 includes an X-ray controller 28 that provides power and timing signals to an X-ray source 14 and a gantry motor controller 30 that controls the rotational speed and position of gantry 12. An image reconstructor 34 receives sampled and digitized X-ray data from DAS 32 and performs high-speed reconstruction. The reconstructed image is applied as an input to a computer 36, which stores the image in a mass storage device 38. Computer 36 also receives commands and scanning parameters from an operator via console 40. An associated display 42 allows the operator to observe the reconstructed image and other data from computer 36. The operator supplied commands and parameters are used by computer 36 to provide control signals and information to DAS 32, X-ray controller 28, and gantry motor controller 30. In addition, computer 36 operates a table motor controller 44, which controls a motorized table 46 to position patient 22 and gantry 12. Particularly, table 46 moves portions of patient 22 through a gantry opening 48.

Figure 2:
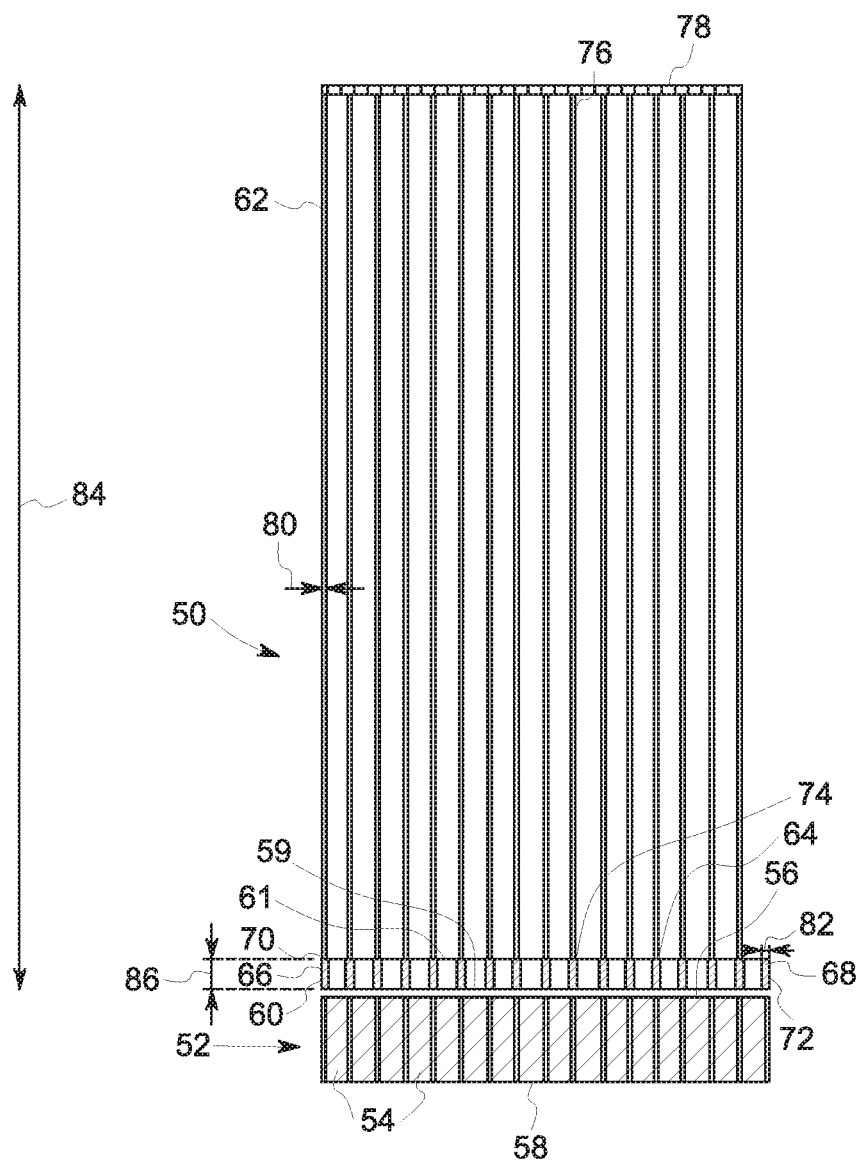
FIG. 2 is a view of an embodiment of a collimator module integrated with a scintillator pack.

FIG. 2 is a view of an embodiment of a collimator module 50 (e.g., 1D collimator module) integrated with a scintillator pack 52. The scintillator pack 52 includes a plurality of scintillator elements 54. The scintillator pack 54 may include any number of scintillator elements 54. As depicted, the scintillator pack 54 includes 16 scintillator elements 54. Each scintillator element 54 is formed from a substance that absorbs radiation (for example X-ray photons) and in response emits light (e.g., isotropically) of a characteristic wavelength, such as an optical wavelength, thereby releasing the absorbed energy. With regard to the present technique, various types of scintillation materials (e.g., GE Gemstone™, GE Lumex™, gadolinium oxysulfide (GOS), etc.) may be employed which convert the radiation incident on the detector module (e.g., detector module 20), such as X-rays photons, into a form of radiation detectable by a layer of photodetectors (e.g., photodiode(s) or detector elements of a detector array). Thus, in such an implementation, X-ray photons impinging on the detector module can be detected by the photodetector layer, so long as the impinging X-ray photons interact with the scintillator elements 54 to generate one or more detectable photons, such as optical photons. The photodetector layer generates analog electrical signals in response to the light emitted by the scintillator 50. The electrical signals generated by the photodetector layer are in turn acquired by signal electronics. The signals from the signal electronics may in turn be acquired by the data acquisition circuitry 32 (FIG. 1). As discussed above, the acquired signals are supplied to data processing circuitry and/or to image reconstruction circuitry. The scintillator pack 52 includes a first side 56 that interfaces with the collimator module 50 and a second side 58 (opposite the first side 56) that interfaces with the photodetector layer.

The collimator module 50 includes a primary collimation grid 60 coupled to (e.g., integrated with) a plurality of plates 62 (e.g., scatter plates). As described in greater detail below, the functions of primary beam collimation and absorbing scattered radiation are separated between the primary collimation grid 60 and the plurality of plates 62. The primary collimation grid 60 is disposed above the scintillator pack 52 (e.g., on the side 56). The primary collimation grid 60 includes a first side 59 that interfaces with the scintillator pack 52 and a second side 61 (opposite the first side 59) that interfaces with the plurality of plates 62. The primary collimation grid 60 includes a plurality of radiation absorbing elements 64 (e.g., septa) spaced apart from each other. The primary collimation grid 60 may include any number of radiation absorbing elements 64. As depicted, the primary collimation grid 60 includes 17 radiation absorbing elements 64. In certain embodiments, the primary collimation grid 60 is a cast epoxy with the radiation absorbing elements 64. Adjacent radiation absorbing elements 64 are configured to perform primary beam collimation for a respective scintillator element 54 disposed beneath the primary collimation grid 60 between the adjacent radiation absorbing elements 64. The radiation absorbing elements 64 may be made of tungsten, lead, or molybdenum, or another radiation absorbing material. As depicted, the primary collimation grid 60 includes a first edge 66 and a second edge 68. A first radiation absorbing element 70 and a second radiation absorbing element 72 (of the plurality of radiation absorbing elements 64) are disposed on the first edge 66 and the second edge 68, respectively.

The plurality of plates 62 may include any number of plates 62. As depicted, the collimator module 50 includes 16 plates 62. Each plate 62 is configured to absorb scattered radiation. Each plate 62 is focally aligned with a point in space. The plates 62 may be made of tungsten, lead, or molybdenum, or another radiation absorbing material. A respective plate 62 is disposed over (e.g., vertically aligned with) each radiation absorbing element 64 (including radiation absorbing element 70 along the first edge 66) except for the radiation absorbing element 72 on the second edge 68 of the primary collimation grid 60. While the primary collimation grid 60 performs primary beam collimation for the scintillator pack 52 coupled to the respective collimator module 50 and associated photodetectors of the detector array, the skipped plate 62 (i.e., absence of the plate 62 along the edge 68) enables a portion of the absorption of the scattered radiation to be shared by an adjacent plate 62 of an adjacent collimator module 50 as described in greater detail below. By not sharing a plate across the module to module boundary (e.g., due to the skipped plate 62), module to module thermal mechanical movement issues are avoided since each collimator module 50 is insensitive to movement. In addition, the collimator assembly having the collimator modules is not subject to overly tight tolerance control. Further, by not sharing a plate at the module to module boundary, the need for precision detector rail temperature control is reduced. Thus, the present embodiments of the collimator assembly may reduce artifacts in images (e.g., thermal expansion induced artifacts).

Each plate 62 includes a first end 74 and a second end 76. The first ends 74 of the plates 62 are coupled to the primary collimation grid 60 (e.g., at the locations of the radiation absorbing elements 64). The second ends 74 of the plates 62 are coupled to a sheet 78 that extends across the plurality of plates 62 in a direction from the first edge 66 to the second edge 68. In certain embodiments, the sheet 78 is made of a carbon composite material. In other embodiments, the sheet 78 is made of plastic or cardboard. The sheet 78 provides stiffness to the plurality of plates 62. In certain embodiments, the plates 62 are coupled to the primary collimation grid 60 and the sheet 78 via an adhesive. In other embodiments, the plates 62 are coupled (e.g., jig assembled) to the primary collimation grid 60 and the sheet 78 via keyed features that enable the interlocking of the plates with the grid 60 and the sheet 78. Coupling the plates 62 to the sheet 78 and the primary collimation grid 60 in conjunction with the flanking plates 62 of the plurality of plates 62 provides a four-sided modular collimator assembly that enables the collimator module 50 to be utilized at high speed rotations (a rotation in 0.2 seconds). The four-sided modular collimator assembly also enables for a taller 1D collimator. A taller 1D collimator enables the collimator module 50 to be utilized with detectors having wider coverage (40 mm to 100 mm). In addition, the taller 1D collimator enables the collimator module 50 to be utilized with a 2 focal spot tube (e.g., twin peaks system). The structure of the collimator module 50 may also improve collimator yield due to fewer misalignment issues and a reduction in tight flatness and bow specifications on the plates 62.

Each plate 62 includes a width 80 in the direction between the first edge 66 and the second edge 68. Each radiation absorbing element 64 includes a width 82 (which is greater than a gap in the same direction between adjacent scintillator elements 54) in the direction between the first edge 66 and the second edge 68. The width 82 is greater than the width 80. In certain embodiments, the width 82 is at least two times greater than the width 80. In certain embodiments, the width 80 is approximately 100 micrometers (μm) and the width of 82 is approximately 200 μm. The separation of the primary beam collimation and absorption of scattered radiation in the collimator module 50 in conjunction with the difference in widths 80, 82 between the plates 62 and the radiation absorbing elements together enable a reduction in toggle effect sensitivity. Thus, the present embodiments of the collimator modules 50 may reduce artifacts in images (e.g., focal spot motion induced artifacts)

Each plate 62 also includes a distance 84 (e.g., length or height). The primary collimation grid 60 also includes a distance 86 (e.g., height) between the first and second sides 59, 61. The distance 84 is greater than the distance 86. In certain embodiments, the distance 84 is at least 30 times greater than the distance 86. In certain embodiments, the distance 84 is approximately 30 mm or greater. In certain embodiments, the distance 86 is approximately 1 mm.

Figure 3:
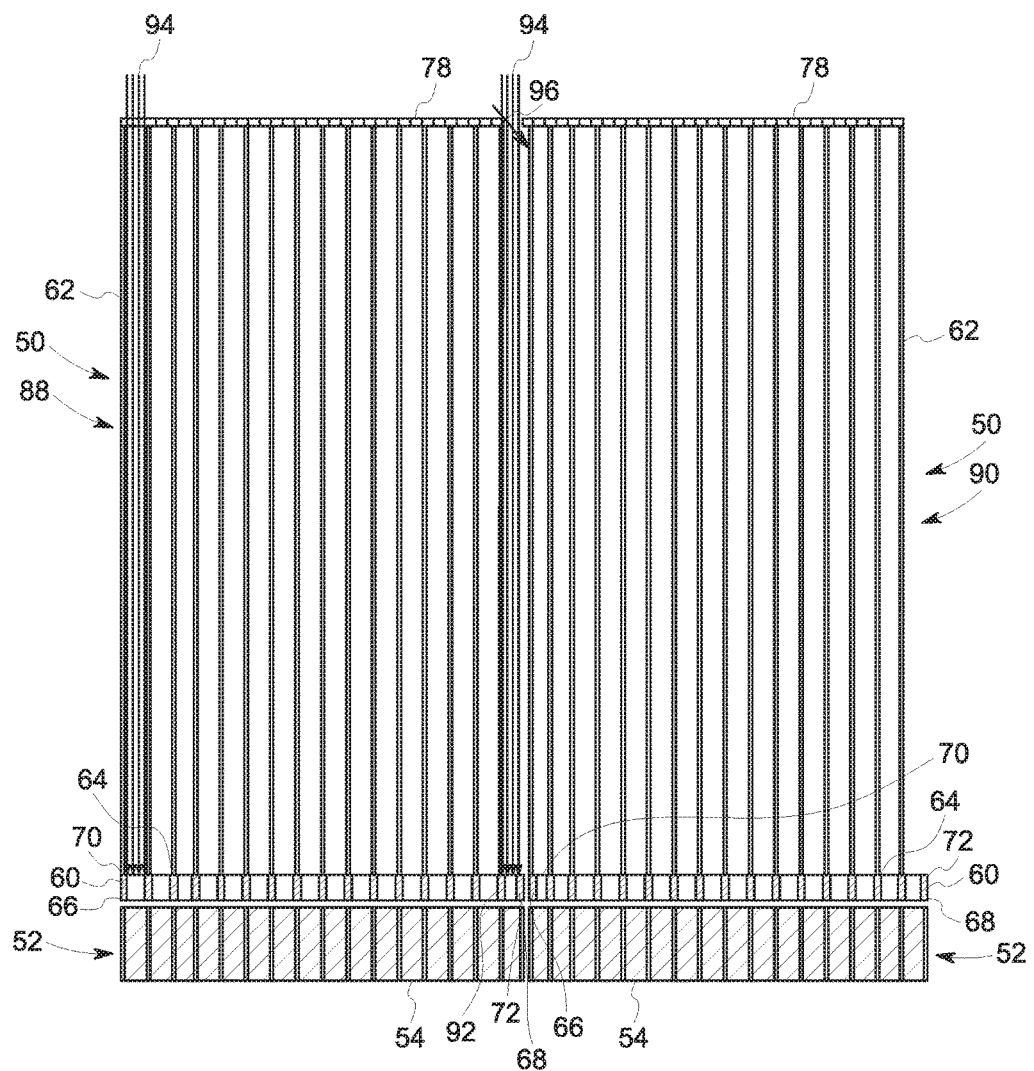
FIG. 3 is a view of an embodiment of adjacent collimator modules integrated with respective scintillator packs.

FIG. 3 is a view of an embodiment of adjacent collimator modules 50 (e.g., collimator modules 88, 90) integrated with respective scintillator packs 52. Each of the collimator modules 88, 90 is as described above in FIG. 2. As depicted, collimator module 88 is disposed adjacent collimator module 90 (e.g., in horizontal alignment). For example, the second edge 68 of the primary collimation grid 60 of the collimator module 88 interfaces with the first edge 66 of the primary collimation grid 60 of the collimator module 90. As depicted, the second radiation absorbing element 72 disposed on the second edge 68 and adjacent radiation absorbing element 92 of the collimator module 90 perform primary beam collimation on the attenuated radiation 94 for the scintillator element 54 and corresponding detector element disposed below and between the radiation absorbing elements 72, 92. As depicted, no plate 62 is disposed above the second radiation absorbing element on the second edge 68 or along a boundary between the adjacent collimator modules 88, 90 to absorb scattered radiation 96. Instead, as depicted, the plate 62 disposed over the first radiation absorbing element 70 on the first edge 66 of the primary collimation grid 60 of the collimator module 90 absorbs a portion of the scattered radiation 96 for that portion of the collimator module 88 along the second edge 68. Thus, the skipped plate construction of the collimator modules 50 enables sharing (functional sharing) of a plate for a portion of the scattered radiation absorption. By not sharing (physically sharing) a plate 62 (e.g., disposed over or vertically aligned with both the first and second edges 66, 68 of adjacent collimator modules 50) across the module to module boundary, module to module thermal mechanical movement issues are avoided since each collimator module 50 is insensitive to movement. In addition, the collimator assembly having the collimator modules 50 is not subject to overly tight tolerance control that is observed in modular collimator arrangements that include plates disposed on both edges of collimator module. Further, by not sharing a plate at the module to module boundary, the need for precision detector rail temperature control is reduced. Thus, the present embodiments of the collimator assembly may reduce artifacts in images (e.g., thermal expansion induced artifacts).

Figure 4:
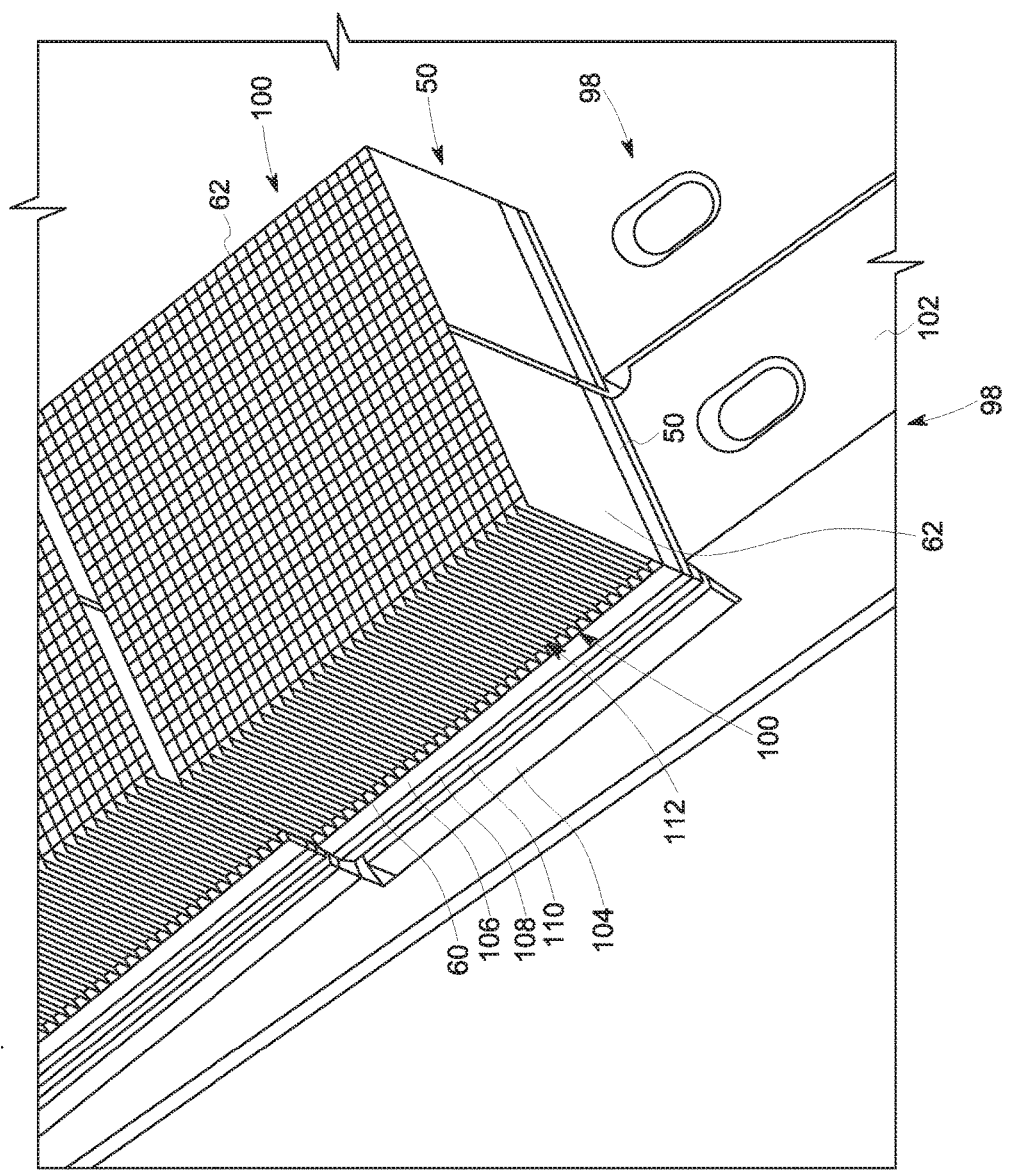
FIG. 4 is a perspective view of a portion of adjacent detector assemblies having a plurality of CT detectors and associated collimator modules.

FIG. 4 is a perspective view of a portion of adjacent detector assemblies 98 having a plurality of CT detectors 100 (e.g., detector modules 20) and associated collimator modules 50 (e.g., 2D collimator modules). The 2D collimator modules 50 are similar to the 1D collimator modules 50 described in FIGS. 2 and 3. As depicted, each CT detector 100 is coupled to a frame or rail 102 via a structure plate 104. The structural plate 104 may include pins that fit into corresponding holes of the frame 102. In addition, the structural plate 104 may include a hole that aligns with a corresponding hole (e.g., between the holes that receive the pins) to receive a fastener (e.g., screw) that couples the CT detector 100 to the frame 102. The CT detector 100 includes the 2D collimator module 50 including the plates 62 disposed above the primary collimation grid 60. The primary collimation grid 60 is coupled to a scintillator layer 106 having the scintillator elements 54. A detector array or photodetector layer 108 is disposed underneath the scintillator layer 106. Beneath the photodetector layer is the signal electronics 110. These components of the CT detector 100 function as described above. As depicted, a plate 62 is not disposed along an X edge 112 of the collimator module 50. In certain embodiments, a plate 62 may not be disposed along a Z edge of the collimator module 50. In certain embodiments, the 2D collimator module 50 may be manufactured via additive manufacturing.

Figure 5:
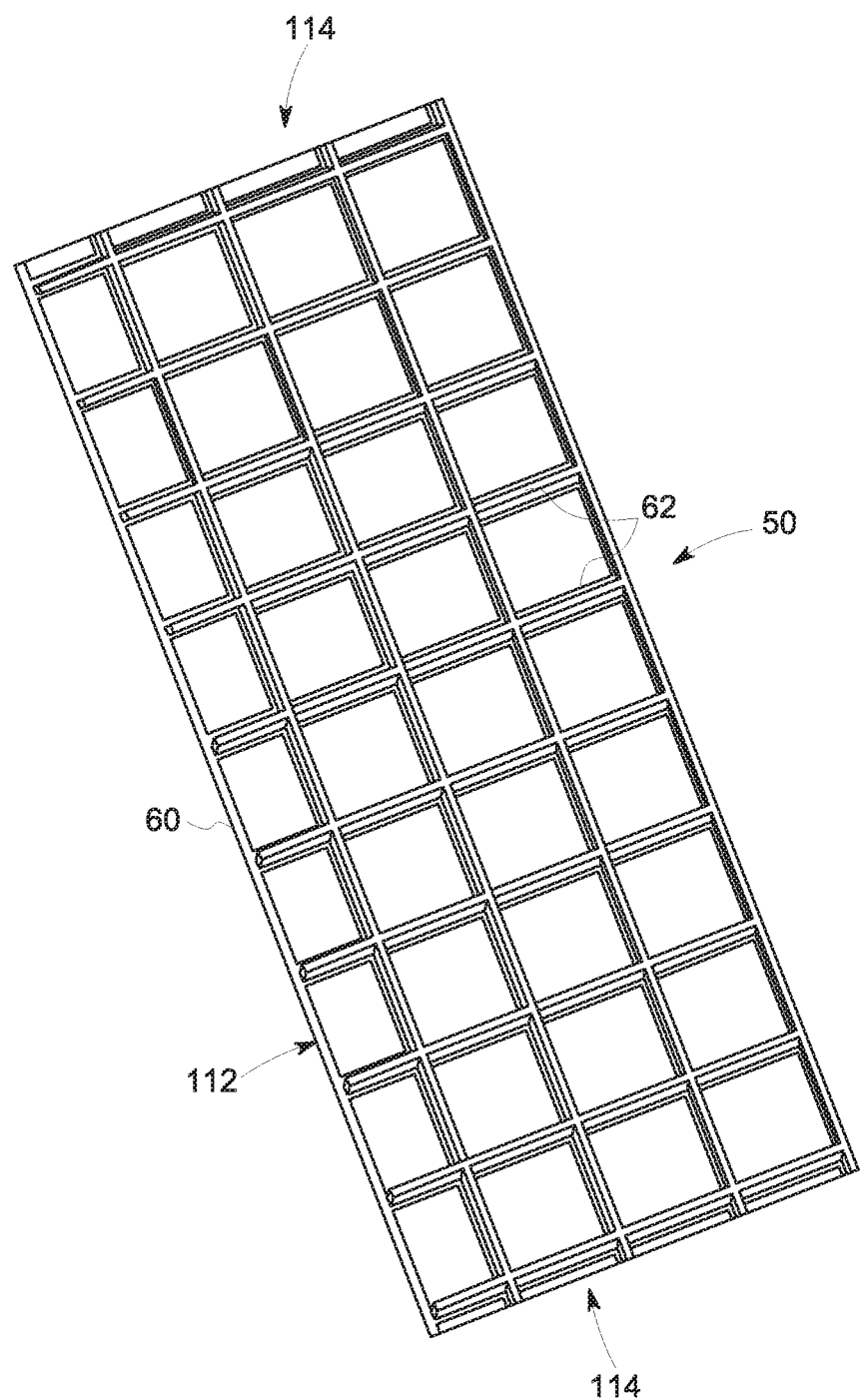
FIG. 5 is a top perspective view of a collimator module in FIG. 4.

FIG. 5 is a top perspective view of the 2D collimator module 50 in FIG. 4. As depicted, a plate 62 is not disposed along the X edge 112 of the collimator module 50. In certain embodiments, a plate 62 may not be deposed along a Z edge 114 of the collimator module 50.

Technical effects of the disclosed embodiments include providing a collimator module 50 that includes the plates 62 and the primary collimation grid 60 that perform separate functions. For example, the plates 62 absorb scattered radiation and the primary collimation grid performs primary beam collimation. The primary collimation grid 60 includes spaced apart radiation absorbing elements 64 including along edges of the grid 60. One of the edges of the collimator module 50 lacks a plate 62 disposed over one of the edges of the grid. An adjacent plate 62 of an adjacent collimator module 50 may absorb some of the scattered radiation for the other collimator module 50. The disclosed embodiments of the collimator module 50 may reduce image artifacts (e.g., thermal expansion induced artifacts, focal spot motion induced artifacts, etc.), while enabling the collimator module 50 to be utilized with a detector having wider coverage (e.g., 40 millimeters (mm) to 100 mm) and with a 2 focal spot tube (twin peaks tube system). Thus, the collimator module 50 may be utilized at higher rotation speeds (e.g., rotation in 0.2 seconds).

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An imaging detector assembly, comprising:
    a detector array comprising a plurality of detector elements;

a scintillator assembly configured to receive incident radiation and configured to convert incident radiation into lower energy optical photons for transmission to the detector array, wherein the scintillator assembly comprises a plurality of scintillator packs, each scintillator pack comprises a plurality of scintillator elements, and each scintillator element provides the lower energy optical photons to a respective detector element of the plurality of detector elements; and a collimator assembly comprising a plurality of collimator modules, wherein each collimator module is disposed above a respective scintillator pack, each collimator module comprises a primary collimation grid comprising a plurality of radiation absorbing elements spaced apart from each other and configured to provide primary beam collimation, each primary collimation grid comprises a first radiation absorbing element disposed on a first edge and a second radiation absorbing element disposed on a second edge opposite the first edge, each collimator module comprises a plurality of plates configured to absorb scattered radiation, each plurality of plates is disposed on a first side of the primary collimation grid opposite from the respective scintillator pack, and a respective plate of each of the plurality of plates is disposed over a respective radiation absorbing element of the respective plurality of radiation absorbing elements of the respective primary collimation grid except the second radiation absorbing element disposed on the second edge of the respective primary collimation grid.

2. The imaging detector assembly of claim 1, wherein the plurality of collimator modules comprises a first collimator module and a second collimator module disposed adjacent each other, and wherein the second collimator module is configured to absorb some of the scattered radiation for the first collimator module.

3. The imaging detector assembly of claim 2, wherein the first collimator module comprises a first primary collimation grid and the second collimator module comprises a second primary collimation grid, and the second edge of the first primary collimation grid is disposed adjacent to the first edge of the second collimator module.

4. The imaging detector assembly of claim 3, wherein a plate disposed over the first radiation absorbing element disposed along the first edge of the second collimator module is configured to absorb some of the scattered radiation for the first collimator module.

5. The imaging detector assembly of claim 1, wherein each radiation absorbing element of each respective primary collimation grid comprises a first width in a direction between the first edge and the second edge, the respective plate of each of the plurality of plates comprises a second width in the direction, and the first width is greater than the second width.

6. The imaging detector assembly of claim 5, wherein the first width is twice the second width.

7. The imaging detector assembly of claim 1, wherein each of the plurality of plates comprises a carbon composite sheet coupled to the plurality of plates at a first end of each plate of the plurality of plates opposite a second end coupled to the respective primary collimation grid, and the carbon composite sheet extends across the plurality of plates in a direction from the first edge to the second edge.

8. The imaging detector assembly of claim 1, wherein each primary collimation grid comprises a cast epoxy.

9. The imaging detector assembly of claim 1, wherein each plate of each plurality of plates is focally aligned to a point in space.

10. The imaging detector assembly of claim 1, wherein each primary collimation grid comprises a first distance between the first side and a second side opposite the first side in a direction perpendicular to a longitudinal axis between the first edge and the second edge, each plate of each of the plurality of plates comprises a second distance in the direction, and the second distance is greater than the first distance.

11. The imaging detector assembly of claim 10, wherein the second distance is 30 times greater than the first distance.

12. The imaging detector assembly of claim 1, wherein each plurality of collimator modules comprises a one-dimensional collimator module.

13. The imaging detector assembly of claim 1, wherein each plurality of collimator modules comprises a two-dimensional collimator module.

14. The imaging detector assembly of claim 1, wherein the imaging detector assembly is configured for utilization with a computed tomography imaging system.

15. A collimator for an imaging detector assembly of a computed tomography imaging system, comprising:
a first collimator module, comprising:
a first primary collimation grid having a first edge and a second edge, wherein the first primary collimation grid comprises a first plurality of radiation absorbing elements spaced apart from each other and configured to provide primary beam collimation, and a first radiation absorbing element of the first plurality of radiation absorbing elements disposed on the first edge and a second radiation absorbing element of the first plurality of radiation absorbing elements disposed on the second edge; and
a first plurality of plates located on a first side of the first primary collimation grid and configured to absorb scattered radiation, wherein a respective plate of the first plurality of plates is disposed over a respective radiation absorbing element of the first plurality of radiation absorbing elements of the first primary collimation grid except the second radiation absorbing element disposed on the second edge of the first primary collimation grid.

16. The collimator of claim 15, comprising a second collimator module, wherein the second collimator module comprises:
a second primary collimation grid having a third edge and a fourth edge, wherein the second primary collimation grid comprises a second plurality of radiation absorbing elements spaced apart from each other and configured to provide primary beam collimation, and a third radiation absorbing element of the second plurality of radiation absorbing elements disposed on the third edge and a fourth radiation absorbing element of the second plurality of radiation absorbing elements disposed on the fourth edge; and
a second plurality of plates located on a second side of the second primary collimation grid and configured to absorb scattered radiation, wherein a respective plate of the second plurality of plates is disposed over a respective radiation absorbing element of the second plurality of radiation absorbing elements of the second primary collimation grid except the fourth radiation absorbing element disposed on the fourth edge of the second primary collimation grid.

17. The collimator of claim 16, wherein the first collimator module is disposed adjacent the second collimator module so that the second edge interfaces with the third edge.

18. The collimator of claim 17, wherein a plate of the second plurality of plates disposed over the third radiation absorbing element is configured to absorb some of the scattered radiation for the first collimator module.

19. The collimator of claim 15, wherein the each radiation absorbing element of the first primary collimation grid comprises a first width in a direction between the first edge and the second edge, and each plate of the first plurality of plates comprises a second width in the direction, and the first width is greater than the second width.

20. A collimator for an imaging detector assembly of a computed tomography imaging system, comprising:
a plurality of collimator modules, wherein each collimator module comprises a primary collimation grid comprising a plurality of radiation absorbing elements spaced apart from each other and configured to provide primary beam collimation, each primary collimation grid comprises a first radiation absorbing element disposed on a first edge and a second radiation absorbing element disposed on a second edge opposite the first edge, each collimator module comprises a plurality of plates configured to absorb scattered radiation, each plurality of plates is disposed on a side of the primary collimation grid, and a respective plate of each of the plurality of plates is disposed over a respective radiation absorbing element of the respective plurality of radiation absorbing elements of the respective primary collimation grid except the second radiation absorbing element disposed on the second edge of the respective primary collimation grid, and wherein the plurality of collimator modules comprises a first collimator module and a second collimator module disposed adjacent each other, the first collimator module comprises a first primary collimation grid, the second collimator module comprises a second primary collimation grid, the second edge of the first primary collimation grid is disposed adjacent to the first edge of the second collimator module, and a plate disposed over the first radiation absorbing element disposed along the first edge of the second collimator module is configured to absorb some of the scattered radiation for the first collimator module.

\* \* \* \* \*